United States Patent [19]
Ito et al.

[11] Patent Number: 5,826,172
[45] Date of Patent: Oct. 20, 1998

[54] MOBILE COMMUNICATIONS SYSTEM FOR REPEATEDLY TRANSMITTING PAGING SIGNALS

[75] Inventors: Shogo Ito, Yokohama; Yasushi Yamao, Yokosuka; Shinzo Ohkubo, Tokorozawa, all of Japan

[73] Assignee: NTT Mobile Communications Network, Inc., Tokyo, Japan

[21] Appl. No.: 537,616

[22] Filed: Oct. 2, 1995

[30] Foreign Application Priority Data

Feb. 3, 1994 [JP] Japan ..................................... 6-011901
Feb. 2, 1995 [WO] WIPO ....................... PCT/JP95/00134

[51] Int. Cl.$^6$ ...................................................... H04Q 9/14
[52] U.S. Cl. .......................... 455/38.3; 455/343; 455/458; 340/825.44; 370/311
[58] Field of Search ................................. 455/31.1, 32.1, 455/38.1, 38.2, 38.4, 54.1, 70, 68, 38.3, 343; 370/311, 312, 313, 314; 340/825.44, 311.1; 379/57

[56] References Cited

U.S. PATENT DOCUMENTS 4,882,765 11/1989 Maxwell et al. ........................... 455/18
5,373,506 12/1994 Taylor et al. ............................. 370/311
5,382,949 1/1995 Mock et al. ........................ 340/825.44
5,537,407 7/1996 Park et al. ............................... 370/311

FOREIGN PATENT DOCUMENTS 2-44821 2/1990 Japan .

OTHER PUBLICATIONS ed. Okumura, Y. and Shinji, M., "Fundamentals of Mobile Communications", pub. IECE Japan (first edition published 1 Oct. 1986); pp. 118–120.
Hirai, Y., Nozawa, T. and Ito, S., "BER Performance with Time Diversity Reception in Digital FM Mobile Radio", Proceedings of the 1993 Spring Conference of the IEICE Japan, B-330.

Primary Examiner—Reinhard J. Eisenzopf
Assistant Examiner—Lee Nguyen
Attorney, Agent, or Firm—Cushman Darby & Cushman IP Group of Pillsbury Madison & Sutro LLP

[57] ABSTRACT

In a system which transmits the same paging signals a plurality of times through the air by radio waves, paging signals serve to selectively page radio receivers. Base station facilities can be deployed at a comparatively low cost even when there are few customers per service area by variably setting the number of times that the paging signals are transmitted from the base stations.

4 Claims, 9 Drawing Sheets

MOBILE COMMUNICATIONS SYSTEM FOR REPEATEDLY TRANSMITTING PAGING SIGNALS

TECHNICAL FIELD

This invention is utilized for calling radio receivers, and relates in particular to a mobile communications system which repeatedly transmits a signal for selectively calling a receiver. The invention also relates in particular to the receiver.

Although the techniques for selectively calling a mobile unit are available in general to mobile communications, the explanations given hereinafter will, for the sake of simplicity, and by way of example, deal with selective radio paging systems that employ receive-only mobile units.

BACKGROUND TECHNOLOGY

FIG. 1 shows an example of the overall constitution of a selective radio paging system. This system has central station 1 and a plurality of base stations 2. A paging signal sequence is transmitted from central station 1 to base stations 2 via links, with the base stations 2 transmitting the paging signal sequence through the air by radio waves. Receiving terminal 3 in the service area receives the paging signal sequence that has been transmitted from base stations 2, and performs paging operations when there is a paging signal addressed to it.

FIG. 9 shows a conventional selective paging sequence which base stations 2 transmit. The explanation given here will deal with the case where an identical selective paging signal is transmitted twice. As shown in FIG. 9(a), the paging signal sequence comprises a series of superframes of period T, each comprising n frames of signal length p joined together. As shown in FIG. 9(b), the signal corresponding to each frame comprises a synchronization signal and a series of paging signals. (The sequences with period T are sometimes called "frames" and the sequences comprising a synchronization signal plus a series of paging signals are sometimes called "subframes". However, in this specification the terms which will be used are respectively "superframe" and "frame".) The receiving terminals are divided into n groups, and a receiving terminal belonging to group i ($1 \leq i \leq n$) becomes capable of receiving only during a frame i reception time, whereupon it receives the paging signals in that frame. When the received signal is a paging signal for the receiving terminal in question, that receiving terminal performs paging operations. A system in which a receiving terminal becomes capable of receiving only during the frame reception time allotted to that terminal is called an "intermittent receiving system", and achieves an extended battery life.

Presently, the transmission quality in mobile communications deteriorates due to fading and the like. In a selective radio paging system, therefore, identical paging signals are transmitted a plurality of times. FIG. 9(b) shows frames transmitted to receiving terminals belonging to group i, for the case where identical paging signals are transmitted twice. In frame i transmitted at time t0, the synchronization signal is followed by transmission of paging signal a for the second time and paging signals b and c for the first time. At time t0+T, which is the next transmission time, the synchronization signal is followed by transmission of paging signals b and c for the second time and paging signal d for the first time. At time t0+2T, which is the next transmission time, the synchronization signal is followed by transmission of paging signal d for the second time and paging signal e for the first time.

If identical paging signals are thus transmitted a plurality of times at the transmitting side, any of these paging signals could be received correctly at the receiving side, and consequently there is an increased probability that a given paging signal will be correctly received. For example, if the probability of not correctly receiving a paging signal when it is transmitted once is Pe, the probability of not correctly receiving it when it is transmitted transmitted n times will be $Pe^n$ (and the probability of correctly receiving it is $1-Pe^n$). It will therefore be seen that the probability of correctly receiving increases with increasing number of transmissions. This is explained in detail in, for example, "Fundamentals of Mobile Communications", ed. Okumura, Y. and Shinji, M., pp.118–120, pub. IECE Japan (first edition published 1 Oct. 1986).

The probability of correctly receiving is further increased by time diversity reception, at the receiving side, of identical paging signals that have been transmitted a plurality of times. One time diversity method involves using the detector output for each bit as taught in Hirai, Y., Nozawa, T. and Itō, S., "BER performance with time diversity reception in digital FM mobile radio", Proceedings of the 1993 Spring Conference of the EICE Japan, B-330; and in Jap. Pat. Appl. No.5-117216 and P C T/JP94/00400 which is based on this Japanese application. According to this method, because the error rate of the bits that comprise a given paging signal is improved every time the signal is received, the probability of not correctly receiving a given paging signal by using a time diversity reception method when said signal is transmitted twice will be:

$$Pe(1) \times Pe(2)$$

where Pe(1) (Pe(1)=Pe) is the probability of not correctly receiving a paging signal transmitted once and Pe(2) (Pe(2) <Pe(1)) is the probability of not correctly receiving a paging signal transmitted twice. Likewise, the probability of not correctly receiving a given paging signal by time diversity reception when said signal is transmitted n times will be:

$$Pe(1) \times Pe(2) \times \ldots \times Pe(n)$$

[where $Pe(1) > Pe(2) > \ldots > Pe(n)$]

It will therefore be seen that with time diversity reception, an increase in the number of times that transmission is carried out results in the probability of correctly receiving increasing more than in the ordinary method described above.

Of those having a high degree of importance, a preferred transmission of data transmitted a plurality of times is taught in Jpn. Pat. Appl. Kōkai No. 1-174026 as a modification of the technique of transmitting an identical paging signal a plurality of times. Jpn. Pat. Appl. Kōkai No.2-44821 teaches transmitting after adding to the paging signal information relating to how many times paging has been carried out. Furthermore, PCT/JP94/00107 teaches forming frames from a plurality of fixed-length subframes, inserting a new paging signal at one end within the frame (for example, in the leading subframe); and inserting a paging signal that is to be transmitted for the second or subsequent time in a subframe arranged at a position corresponding to the number of times.

Nevertheless, the number of times that identical paging signals are transmitted has hitherto been predetermined, resulting in a lack of operational flexibility. For example, despite the number of customers per service area being high in densely populated regions such as metropolitan areas, and low in sparsely populated regions such as provincial areas, the number of times a paging signal is transmitted has been fixed and the service area per base station facility has been approximately constant. As a result, non-densely populated regions have had to have the same deployment of base station facilities as the densely populated regions. Thus, the investment in equipment per customer in non-densely populated regions will inevitably be high.

It is an object of the present invention to overcome this problem, and to provide a mobile communications system and a radio receiver such that the equipment investment does not increase even when there are few customers per service area.

DISCLOSURE OF THE INVENTION

A mobile communications system according to this invention is characterized in that, in a mobile communications system having a transmitting means which transmits paging signals a plurality of times through the air by radio waves, the paging signals serve to selectively page radio receives. Accordingly, a means is provided which variably sets the number of times that paging signals are transmitted from the transmitting means. Another means transmits, from the transmitting means, information relating to the number of times that the paging signals are transmitted. When the transmitting means transmits in units of frames, for the frames comprising one or more paging signals to which a control signal has been added, the information relating to the number of transmissions should be inserted in this control signal.

As well as variably setting the number of times that paging signals are transmitted at the transmitting side, it is desirable to variably set, the number of times that paging signals will be received at the receiving side. That is, the radio receivers should have a means which recognizes the number of times that paging signals from the transmitting means will be transmitted, and a means which recognizes the number of times that paging signals will be received on the basis of the recognition output of this recognition means. A setting means sets the number of times that paging signals will be received on the basis of the recognition output of this recognition means. When information relating to the number of transmissions is transmitted from the transmitting means, there should be a means which receives this information and a means which sets the number of times that paging signals will be received on the basis of the received information.

In order to transmit information relating to the number of transmissions, the method disclosed in Jpn. Pat. Appl. Kōkai No.2-44821 can be utilized after modification. Namely, instead of transmitting after adding information relating to how many times the paging signals in the frame in question will have been transmitted, transmitting is carried out after adding information relating to how many times its paging signals will subsequently be transmitted, and the initial value of a countdown is changed accompanying a change in the number of transmissions. By proceeding in this manner, the number of times each paging signal will subsequently be sent can be recognized at a radio receiver from the received frame, and it is not essential to recognize a change in the number of transmissions.

Alternatively, it is also possible to transmit after inserting information relating to the number of transmissions itself in the control signal of a frame. In particular, when the configuration of the signal within a frame changes accompanying a change in the number of transmissions, information relating to the number of transmissions itself becomes necessary in order for there to be a correspondence with this signal configuration at the receiving side. Thus, the method disclosed in Jpn. Pat. Appl. Kokai No.2-44821 cannot be utilized.

The signal configuration disclosed in PCT/JP94/00107 is one in which the signal configuration within frames changes the accompanying change in the number of transmissions. With this signal configuration, frames are formed from a plurality of subframes of fixed length, and a new paging signal is inserted at one end of the frame (for example, in the leading subframe), while a paging signal that is to be transmitted for the second or subsequent time is inserted in a subframe arranged at a position corresponding to the number of times. Under these circumstances, if the number of transmissions is changed, the number of subframes required within a frame will change correspondingly. In order to make effective use of the space within a frame, it is desirable to change the configuration of the subframes accompanying a change in the number of transmissions. That is, the transmitting side should have a means which forms n subframes within a frame when the number of transmissions is n. The means which forms n subframes should include a means which inserts a new paging signal in a subframe positioned at one end of said frame, and which inserts a paging signal that is to be transmitted for the second or subsequent time in a subframe arranged at a position corresponding to the number of times in question. Also, a means which changes the number and length of subframes within a frame when the setting means changes the number of transmissions n. Under these circumstances, the radio receiver should have: a means detects, from the control signal of the received frame, information relating to the number of transmissions. Also, a means decides the subframe configuration of the received frame from the detected information relating to the number of transmissions.

If matters are arranged so that the number of transmissions of paging signals can be set variably, regions in which the population is not so densely crowded can have the service area per base station enlarged by making the number of transmissions of identical paging signals greater than that in densely populated regions. In densely populated regions, when there is little traffic (e.g., during the night), if the number of transmissions of identical paging signals is made greater than at ordinary times, a service with high quality transmission of paging signals can be achieved.

OPTIMUM CONFIGURATION FOR EMBODYING THE INVENTION

Figure 1:
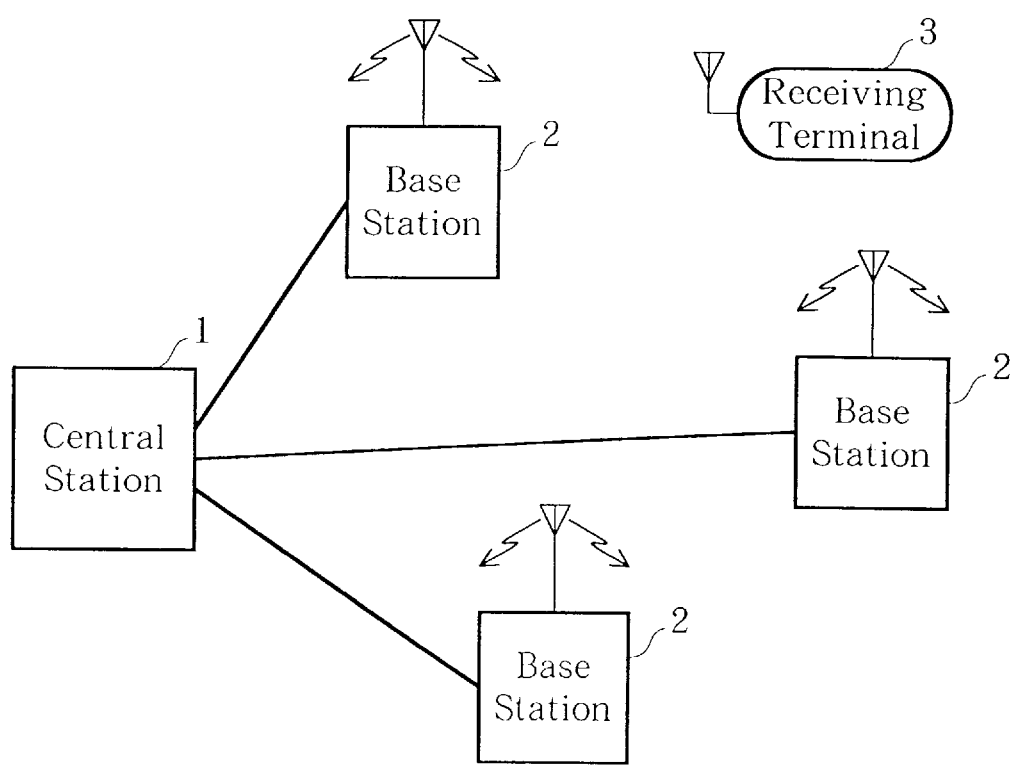
FIG. 1 block diagram showing an example of the overall constitution of a selective radio paging system.
Figure 2:
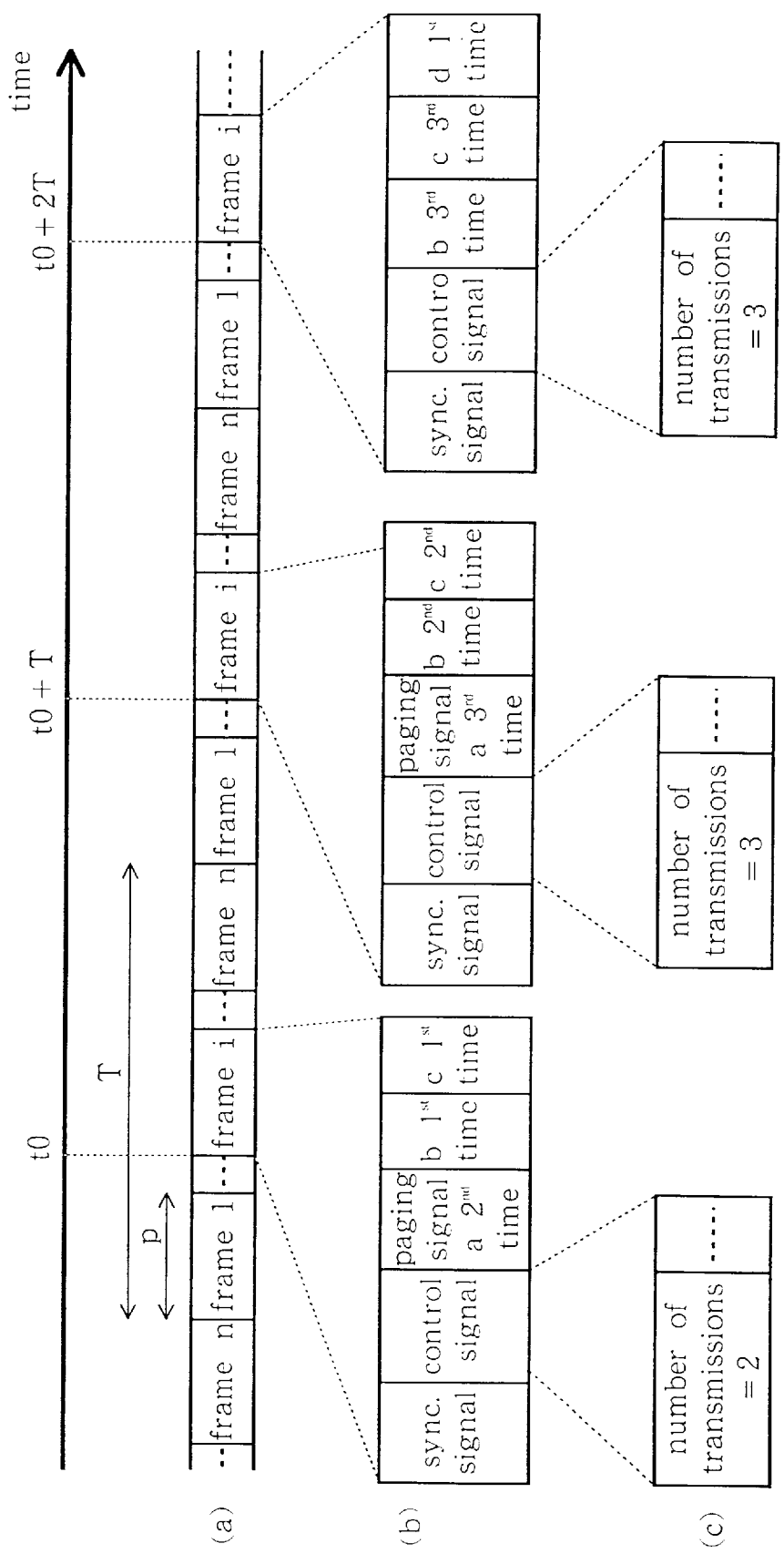
FIG. 2 embodiment of the selective paging signal sequence transmitted by base stations.

FIG. 1 is a block diagram showing a selective radio paging system which embodies this invention, and FIG. 2 shows an embodiment of the selective paging signal sequence transmitted by the base stations. This selective radio paging system has a plurality of base stations 2 which serve as transmitting means the paging signals are transmitted a plurality of times through the air by radio waves, and serve to selectively page a receiving terminal 3. The central station 1 includes a means which variably sets the number of times that the paging signals are transmitted from these base stations 2.

In accordance with a paging request from a telephone network, central station 1 forms frames comprising a synchronization signal, a control signal, and a series of paging signals, and transmits these signals to base stations 2 via links. Base stations 2 transmit these frames through the air by radio waves. The control signal in each frame contains information indicating the number of transmissions, so that the state of the receiving terminal can be changed in accordance with the transmission parameters and mode that have been specified.

As shown in FIG. 2(a), the paging signal sequence comprises a sequence having superframes of period T, each comprising n frames of signal length p joined together. This is the same as the prior art example. As shown in FIG. 2(b), the signal corresponding to each frame contains a control signal in addition to the synchronization signal and the series of paging signals. As shown in FIG. 2(c), the number of transmissions is contained in the control signal. The receiving terminals are divided into n groups in similar fashion to the prior art example, and a receiving terminal belonging to group i ($1 \leq i \leq n$) becomes capable of receiving only during a frame i reception time, whereupon it receives the paging signals in that frame. When the received signal is a paging signal for a given receiving terminal, that receiving terminal performs paging operations.

The operation of transmitting paging signals to a receiving terminal belonging to group i will be explained with reference to FIG. 2, which illustrates the case where the number of transmissions has been changed from two to three. In frame i transmitted at time t0, the synchronization signal is followed by transmission of a control signal indicating that the number of transmissions is 2, and then by transmission of paging signal a for the second time, paging signal b for the first time, and paging signal c for the first time. It will be supposed that the number of transmissions has changed from 2 to 3. Accordingly, at time t0+T, which is the next transmission time, the synchronization signal is followed by transmission of a control signal indicating that the number of transmissions is 3, and then by transmission of paging signal a for the third time, paging signal b for the second time, and paging signal c for the second time. At time t0+2T, the synchronization signal is followed by transmission of a control signal indicating that the number of transmissions is 3, and then by transmission of paging signal b for the third time, paging signal c for the third time, and paging signal d for the first time.

Figure 3:
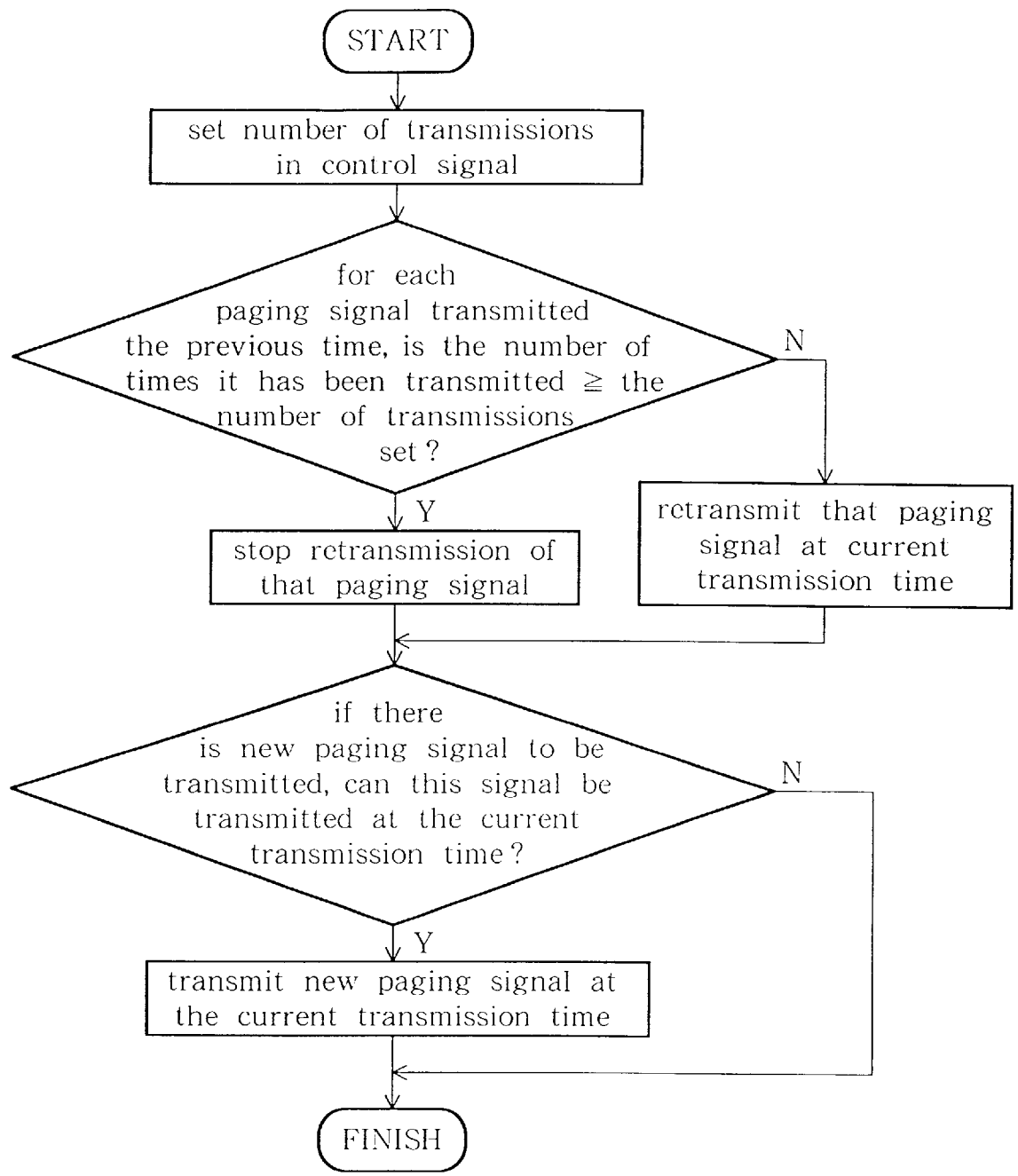
FIG. 3 flowchart of the operation of frame formation by the central station.

FIG. 3 shows the flow of the operation of frame formation by central station 1. In central station 1, when the number of transmissions has been set in a control signal, a comparison is made, for each paging signal transmitted the previous time, of the number of times said paging signal has been transmitted and the number of transmissions that have been set. When the number of times a paging signal has been transmitted is equal to or greater than the number of transmissions that have been set, retransmission of that paging signal is stopped. When the number of times a paging signal has been transmitted is smaller than the number of transmissions that have been set, that paging signal is retransmitted at the current transmission time. When there is a new paging signal to be transmitted and this signal can be transmitted at the current transmission time, the new paging signal is transmitted at this transmission time.

Figure 4:
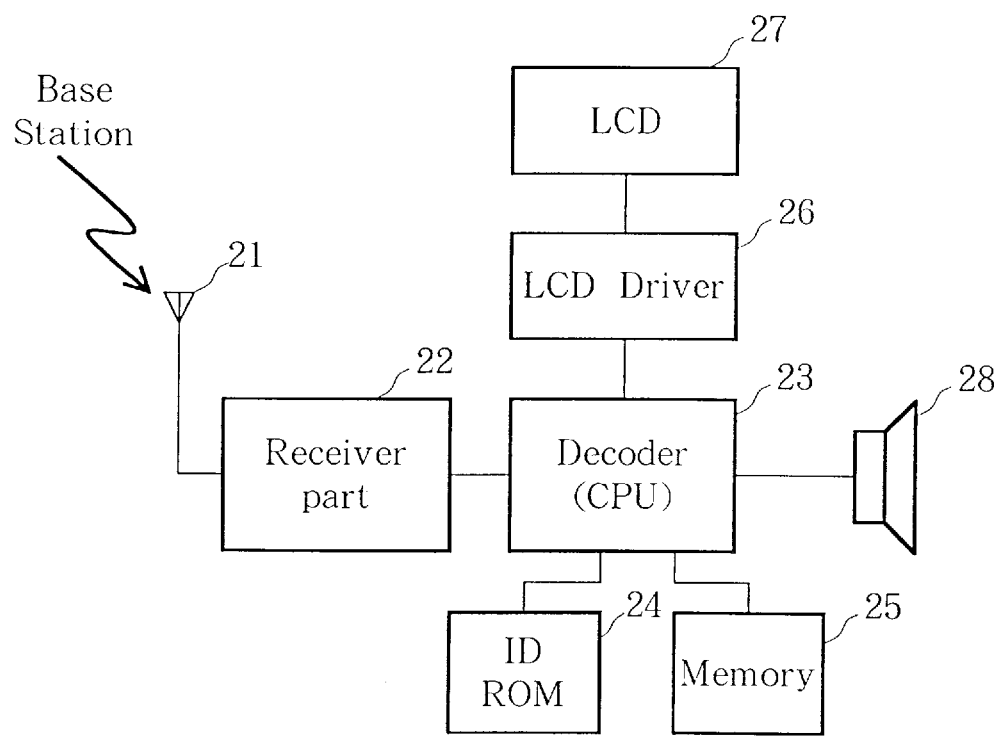
FIG. 4 block diagram showing an example of a radio receiver used as a receiving terminal.

FIG. 4 is a block diagram showing an example of a radio receiver used as a receiving terminal. This radio receiver has antenna 21, receiver part 22, decoder 23, ID ROM 24, memory 25, liquid crystal display driver 26, liquid crystal display 27, and speaker 28. Receiver part 22 receives the paging signal sequence that is input via antenna 21 and supplies the received signal to decoder 23. Decoder 23 receives a synchronization signal, performs synchronization processing, and uses the control signal, which is received next, to set the transmission parameters/mode of the receiver in question as specified by said control signal. The decoder 23 then performs processing of the subsequently received paging signals in accordance with this setting. Decoder 23 also performs the control required for the intermittent receiving, whereby receiver part 22 operates only during the times when the group to which it belongs is receiving.

Figure 5:
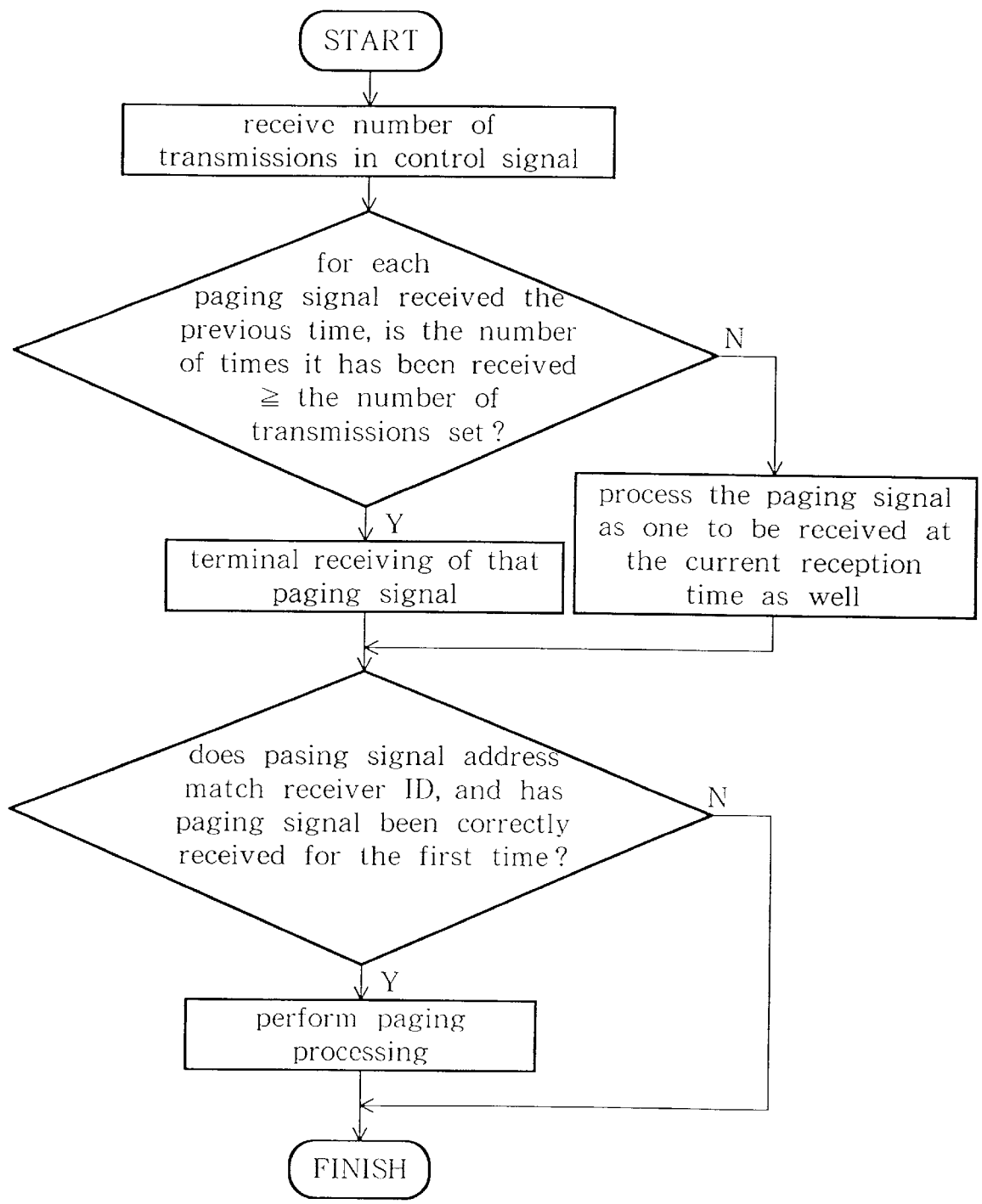
FIG. 5 flowchart of the control of receiving processing by the decoder.

FIG. 5 shows the flow of the control of receiving processing by decoder 23. When decoder 23 receives the number of transmissions in a control signal, it compares, for each paging signal transmitted the previous time, the number of times said paging signal has been received so far, and the received number of transmissions. When the number of receptions is equal to or greater than the number of transmissions, decoder 23 terminates the receiving processing of that paging signal. When the number of receptions is smaller than the number of transmissions, decoder 23 processes the paging signal in question as one which is to be received again at the current reception time. It also compares the address of the received paging signal with its own ID stored in ID ROM 24. If the paging signal and ID are in agreement and the paging signal in question has been correctly received for the first time, it causes speaker 28 to emit an alert and performs paging processing whereby the required information—such as a message—contained in the paging signal is displayed by liquid crystal display 27 via liquid crystal display driver 26.

In this example, the number of transmissions, which is one of the parameters in the control signal, changes in the subframe received at time t0+T to 3 from the previous setting of 2, and radio receivers belonging to group i change their receiving processing to match this. As a result, erroneous paging does not occur.

Figure 6:
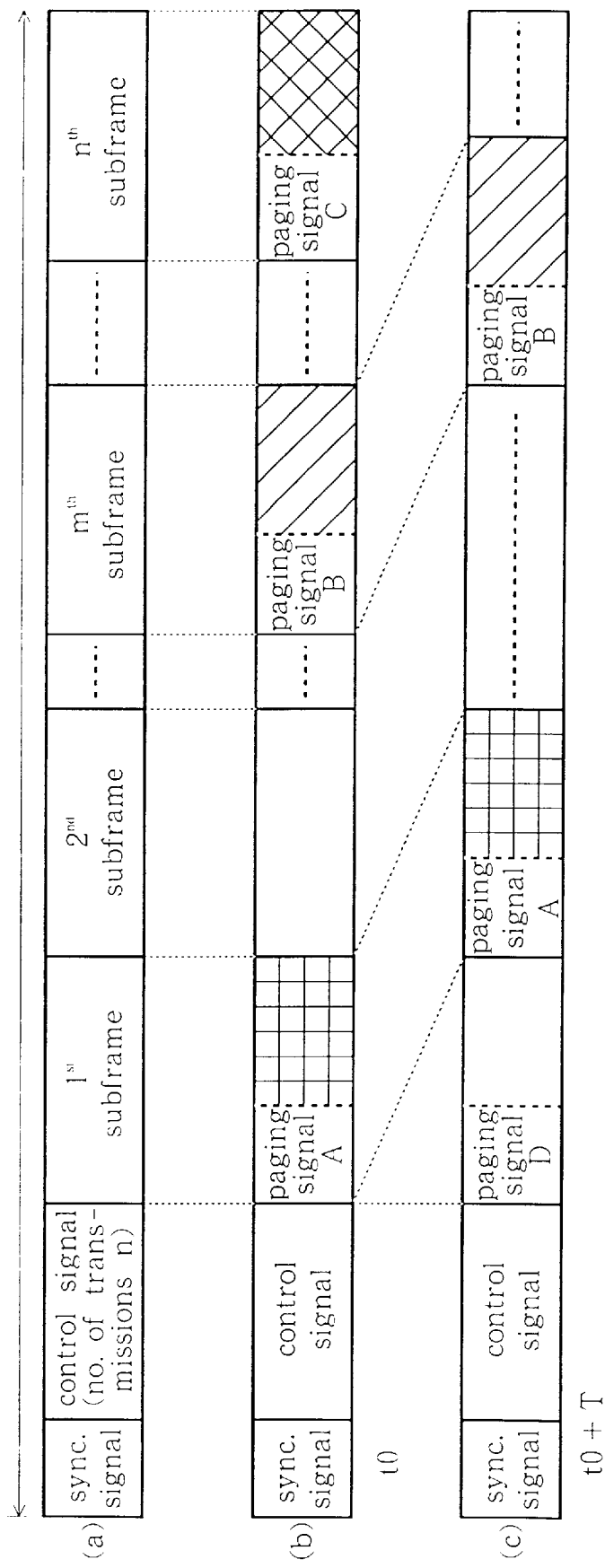
FIG. 6 another embodiment of the selective paging signal sequence transmitted by base stations.

FIG. 6 shows another example of a paging signal sequence. This signal sequence is obtained by modifying the sequence disclosed in PCT/JP94/00107 so that it conforms with the present invention. As shown in FIG. 6(a), each frame comprises a synchronization signal, a control signal, and a plurality of subframes. The number of transmissions n is inserted in the control signal. The subframes are established by dividing the region for paging signals within the frame into equal portions in accordance with the number of transmissions n. Each subframe is capable of transmitting a plurality of paging signals. FIG. 6(b) represents the time t0 frame. Paging signals A, B and C are transmitted in the 1st, $m^{th}$, and $n^{th}$ subframes respectively, in accordance with how many times each has been transmitted. FIG. 6(c) represents the frame at time t0+T (the number of transmissions is n and has not changed). Because paging signal A will be transmitted for the second time, it is transmitted in the second subframe. Because paging signal B will be transmitted for the $(m+1)^{th}$ time, it is transmitted in the $(m+1)^{th}$ subframe. Because transmission of paging signal C for the $n^{th}$ time was completed at time t0, it is not transmitted at time t0+T.

Because paging signal D will have its first transmission at time t0+T, it is transmitted in the first subframe.

It is also possible for the number of subframes in a frame to be set to a fixed number equal to the maximum value of the number of transmissions n, whereupon only the same number of subframes as the number of transmissions n are used. However, when the number of transmissions n is smaller than the maximum value, there will be a wasted region in the frame. The number and length of subframes in the frame should therefore be changed in response to a change in the number of transmissions n, and the subframes should be set by dividing the region for paging signals by the changed number of transmissions n.

Figure 7:
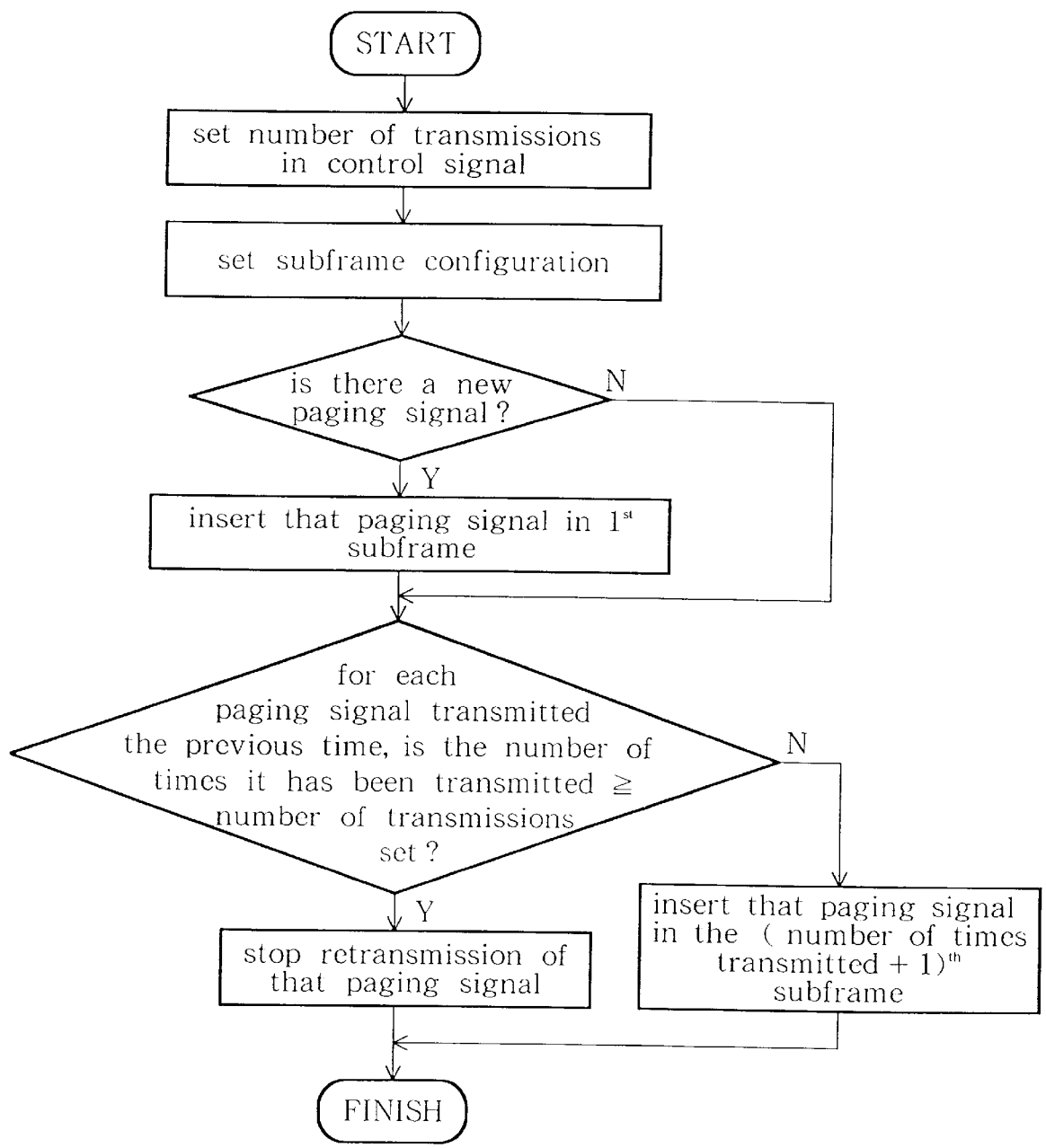
FIG. 7 flowchart of the operation of frame formation by the central station.

FIG. 7 shows the flow of the operation of frame formation by central station I when such a paging signal sequence is used. In central station 1, when the number of transmissions has been set in a control signal, a subframe configuration—corresponding to this number of transmissions will be set. The subframe configuration comprises, for example, the number and length of the subframe. Next, when there is a new paging signal to be transmitted, the next paging signal is inserted in the first subframe. A comparison is then made, for each paging signal transmitted the previous time, of the number of times the paging signal has been transmitted and the number of transmissions that have been set. When the number of times a paging signal has been transmitted is equal to or greater than the number of transmissions that have been set, retransmission of that paging signal is stopped. When the number of times a paging signal has been transmitted is smaller than the number of transmissions that have been set, that paging signal is inserted in the (number of times transmitted+1)$^{th}$ subframe.

Figure 8:
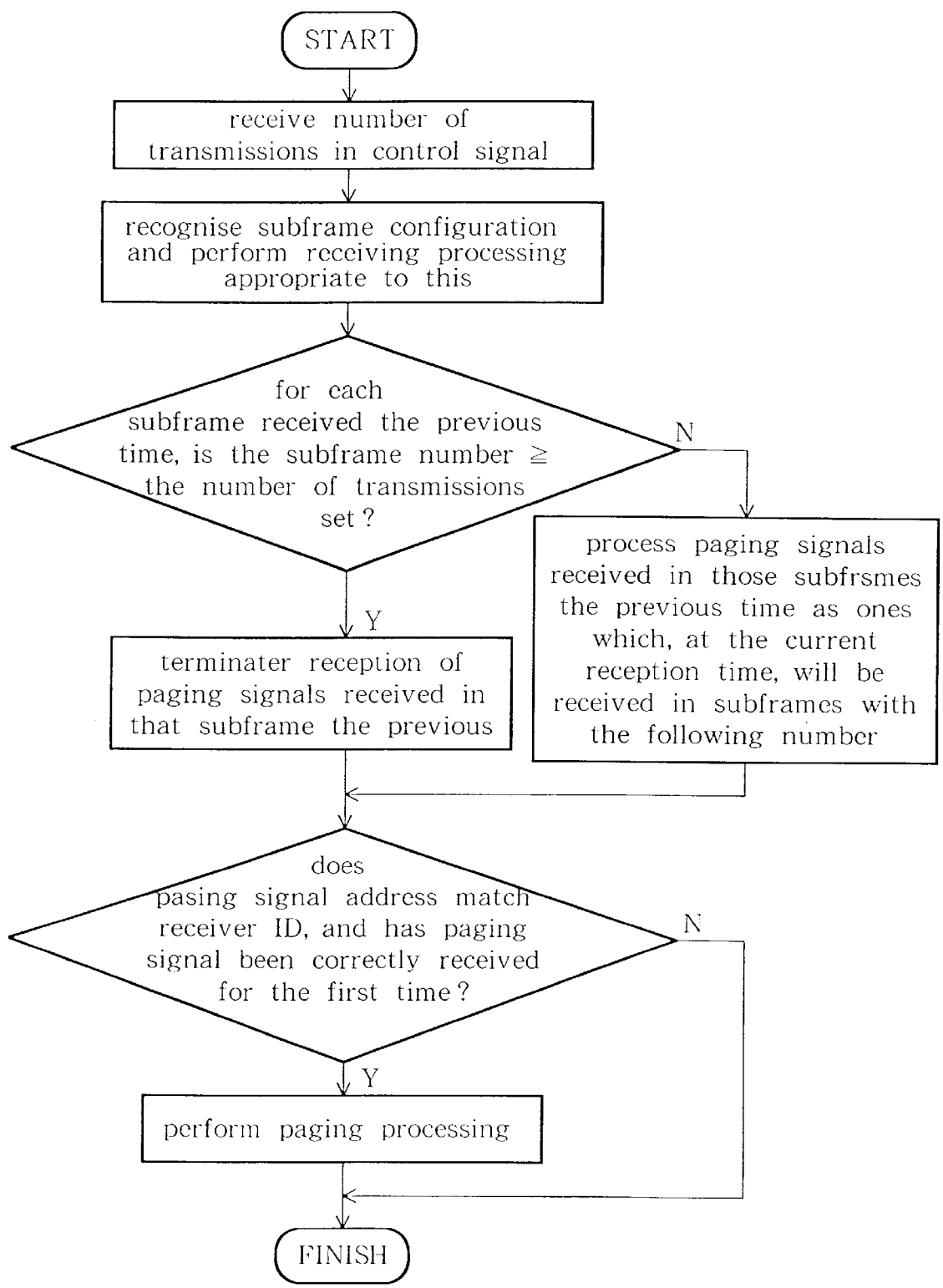
FIG. 8 flowchart of the control of receiving processing by the decoder in the radio receiver.
Figure 9:
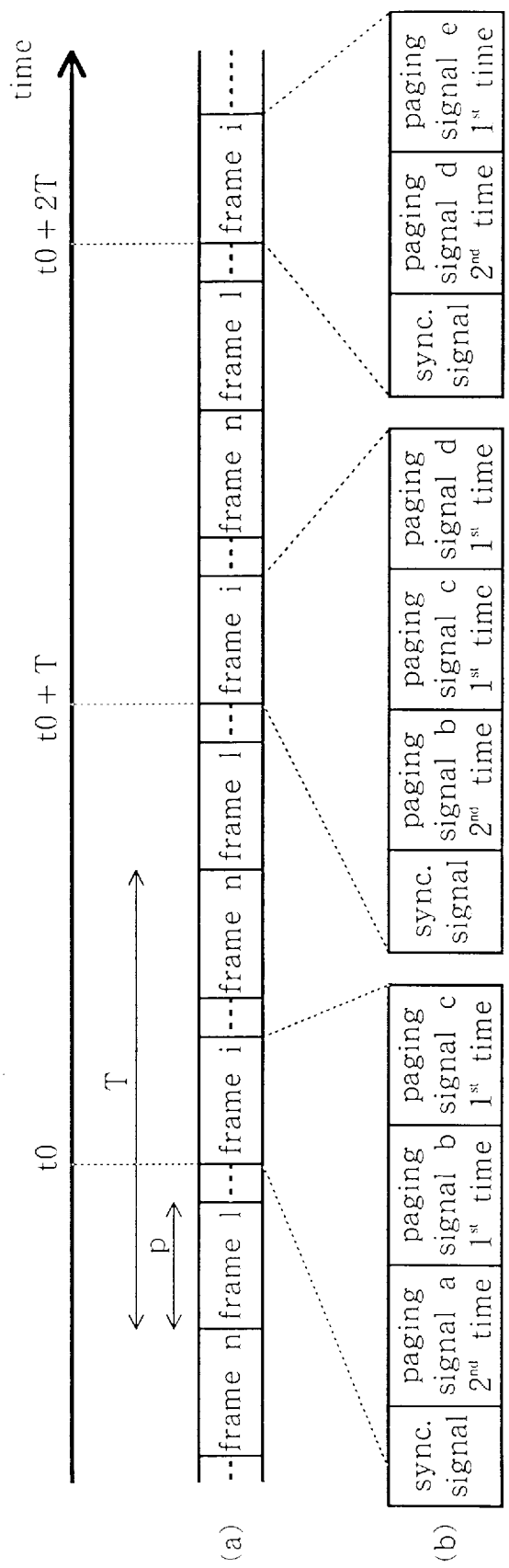
FIG. 9 conventional selective paging signal sequence transmitted by base stations.

FIG. 8 shows the flow of the control of processing by decoder 23 of the radio receiver when the paging signal sequence depicted in FIG. 6 is used. When decoder 23 receives the number of transmissions in a control signal, it recognizes the subframe configuration corresponding to this particular number of transmissions and performs the appropriate processing for receiving. This involves terminating the reception processing on the paging signals which were received in those subframes transmitted the previous time that had a subframe number corresponding to or greater than the number of transmissions. Paging signals received in other subframes are processed as ones which, at the current reception time, are received in subframes with the following number. Decoder 23 then compares the address of the received paging signal with its own ID stored in ID ROM 24. If the paging signal and ID are in agreement and the paging signal in question has been correctly received for the first time, it causes speaker 28 to emit an alarm and performs paging processing whereby the required information, such as a message, contained in the paging signal is displayed by liquid crystal display 27 via liquid crystal display driver 26.

In the foregoing embodiments, information relating to the number of transmissions is transmitted in each frame as one parameter of the control signal. The control signal serves to change the state of the receiving terminal in accordance with the transmission parameters/mode that have been set. This enables the number of transmissions to be changed for each group of receivers. Information relating to number of transmissions can also be inserted in a paging signal.

Although the foregoing explanations have dealt with a selective radio paging system by way of example, this invention can similarly be applied to calling mobile units in cellular and other mobile communications systems.

As explained above, because a mobile communications system and a radio receiver according to this invention enable the number of transmissions of paging signals to be variably set, regions in which the population is not so densely crowded can have the service area per base station enlarged by making the number of transmissions of identical paging signals greater than that in densely populated regions. Additionally, in densely populated regions, when there is little traffic (e.g., during the night), if the number of transmissions of identical paging signals is made greater than at ordinary times, a service with high quality transmission of paging signals can be achieved.

We claim:

1. The mobile communications system comprising:

a transmitting means for transmitting paging signals a plurality of times through the air by radio waves, said paging signals serving to selectively page radio receivers;

a means for variably setting the number of times that said paging signals are transmitted from said transmitting means; and wherein said transmitting means includes:
a means for transmitting information relating to the number of times that said paging signals are transmitted;
a means for transmitting in units of frames, said frames comprising one or more paging signals to which a control signal has been added;
a means for inserting information relating to the number of transmissions in said control signal;
a means for forming n subframes within a frame when the number of transmissions is n;

wherein said means for forming includes:
a means for inserting a new paging signal in a subframe positioned at one end of said frame, and for inserting a paging signal that is to be transmitted for the second or subsequent time in a subframe arranged at a position corresponding to this number of times; and
a means which changes the number and length of subframes within a frame when said setting means changes the number of transmissions n.

2. The mobile communications system as set forth in claim 1, wherein said transmitted paging signals are identical in each transmission of the paging signals.

3. An apparatus comprising:

a transmitting means for transmitting paging signals at plurality of times through the air by radio waves, said paging signals serving to selectively page radio receivers;

a means for variably setting the number of times that said paging signals are transmitted from said transmitting means; and wherein said transmitting means includes:
a means for transmitting information relating to the number of times that said paging signals are transmitted;
a means for transmitting in units of frames, said frames comprising one or more paging signals to which a control signal has been added;
a means for inserting information relating to the number of transmissions in said control signal;
a means for framing n subframes within a frame when the number of transmissions is n;

wherein said means for forming includes:

a means for inserting a new paging signal in a subframe positioned at one end of said frame, and for inserting a paging signal that is to be transmitted for the second or subsequent time in a subframe arranged at a position corresponding to this number of times; and a means which changes the number and length of subframes within a frame when said setting means changes the number of transmissions n;

a radio receiver comprising:

a receiver which receives paging signals from said transmitting means;

a means for detecting from the control signal of a received frame, information relating to the number of transmissions from said transmitting means; and a means for deciding the subframe configuration of said received frame from the detected information relating to the number of transmissions.

4. The apparatus as set forth in claim 3, wherein said transmitted paging signals are identical in each transmission of the paging signals.

* * * * *

UNITED STATES PATENT AND TRADEMARK OFFICE
CERTIFICATE OF CORRECTION

PATENT NO. : 5,826,172
DATED : October 20, 1998
INVENTOR(S) : Ito, et. al.

It is certified that error appears in the above-identified patent and that said Letters Patent is hereby corrected as shown below:

Title page, item --[63] Continuation of international application number PCT/JP95/00134, Feb. 2, 1995.--

Please ADD as the first paragraph of Column 1 to read:

--This is a continuation of international application number PCT/JP95/00134, Feb. 2, 1995.--

Please DELETE in item [30]

"Feb. 2, 1995 [WO] WIPO .................PCT/JP95/00134"

Signed and Sealed this

Twenty-fourth Day of October, 2000

Attest:

Q. TODD DICKINSON

*Attesting Officer*     *Director of Patents and Trademarks*